(12) United States Patent  (10) Patent No.: US 7,516,123 B2
Betz et al.  (45) Date of Patent: Apr. 7, 2009

(54) PAGE RANK FOR THE SEMANTIC WEB QUERY

(75) Inventors: Joseph P. Betz, Arlington, MA (US); Sean J. Martin, Boston, MA (US); Yan Pritzker, Chicago, IL (US); Benjamin H. Szekely, Boston, MA (US); Robert Y. Wang, Suwanee, GA (US)

(73) Assignee: International Business Machines Corporation, Armonk, NY (US)

( * ) Notice: Subject to any disclaimer, the term of this patent is extended or adjusted under 35 U.S.C. 154(b) by 463 days.

(21) Appl. No.: 11/105,698

(22) Filed: Apr. 14, 2005

(65) Prior Publication Data

US 2006/0235841 A1  Oct. 19, 2006

(51) Int. Cl.
  *G06F 17/30* (2006.01)
(52) U.S. Cl. .............................. 707/3; 707/5; 707/100; 707/101; 707/102; 707/104.1
(58) Field of Classification Search ...................... 707/3, 707/5, 101, 104.1; 715/776
  See application file for complete search history.

(56) References Cited

U.S. PATENT DOCUMENTS

| 6,122,647 | A * | 9/2000 | Horowitz et al. ............. 715/205 |
| 6,701,305 | B1 | 3/2004 | Holt et al. .................... 706/45 |
| 2002/0129014 | A1 | 9/2002 | Kim et al. ..................... 707/5 |
| 2003/0105589 | A1 * | 6/2003 | Liu et al. ....................... 702/1 |
| 2003/0120634 | A1 * | 6/2003 | Koike et al. ................... 707/1 |
| 2004/0098250 | A1 * | 5/2004 | Kimchi et al. ................. 704/9 |
| 2006/0004703 | A1 * | 1/2006 | Spivack et al. ................. 707/2 |
| 2006/0004811 | A1 * | 1/2006 | McSherry ................... 707/101 |
| 2006/0026013 | A1 * | 2/2006 | Kraft ............................. 705/1 |
| 2006/0095430 | A1 * | 5/2006 | Zeng et al. .................... 707/7 |
| 2008/0147716 | A1 * | 6/2008 | Omoigui ..................... 707/102 |

OTHER PUBLICATIONS

Chirita et al, "Semantically enhanced Searching and Ranking on the Desktop", Jun, 2006, Proceedings of the 3rd European Semantic Web Conference, pp. 1-15.*
Raj et al, "Phrase grammar-based automatic conceptual tagging system", Jun. 2003, Proceedings of the International Conference on Information and Knowledge Engineering, pp. 212-217.*
The Semantic Web http://www.w3.org/2001/sw/ May 2001 by Tim Berners-Lee, James Hendler and Ora Lassila.

(Continued)

*Primary Examiner*—Charles Rones
*Assistant Examiner*—Rezwanul Mahmood
(74) *Attorney, Agent, or Firm*—John E. Campbell (57) ABSTRACT

Semantically linked pages are queried based on a user supplied interest vector. The interest vector provides a weight for presenting results from the query of pages. The interest vectors are used to calculate the importance of pages of a query based on the weight of semantic links associated with the page known as page rank indicators. Optionally, the calculation is augmented by other page ranking algorithms. An indication of the resulting pages is displayed according to the calculated importance. Preferably the calculation utilizes a dot product of page rank and user interest vectors.

10 Claims, 6 Drawing Sheets

OTHER PUBLICATIONS

Google's PageRank http://web.archive.org/web/20021013113554/http://www.webworkshop.net/pagerank.html Oct. 13, 2002.

Semantic Web Activity http://web.archive.org/web/20010518234230/www.w3.org/2001/sw/ Oct. 10, 2001.

Google's Page Rank Explained and how to make the most of it by Phil Craven http://www.webworkshop.net/pagerank.html, Sep. 25, 2008.

The Anatomy of a Large-Scale Hypertexual Web Search Engine http://infolab.stanfordLedm/-huckrab/google.html, 1998.

Resource Description Framework (RDF) Model and Syntax Specification W3C Recommendation Feb. 22, 1999 http://ww.w3.org/TR/1999/REC-rdf-syntax-19990222/.

Resource Description Framework (RDF) Schema Specification W3C Recommendation Mar. 3, 1999 http://www.w3.org/TR/1990/PR-rdf-schema-19990303/.

RDF/XML Syntax Specification (Revised) W3C Recommendation Feb. 10, 2004 http://www.w3.org/TR/rdf-syntax-grannian.

W3C Semantic Web Activity http://www.w3.org/2001/aw/, 2001.

* cited by examiner

PAGE RANK FOR THE SEMANTIC WEB QUERY

CROSS REFERENCE TO RELATED APPLICATIONS

This application is related, and cross-reference may be made to the following co-pending U.S. patent application filed on even date herewith, assigned to the assignee hereof, and incorporated herein by reference:

U.S. patent Ser. No. 11/105,699 to Betz et al. for WEB PAGE RANKING FOR PAGE QUERY ACROSS PUBLIC AND PRIVATE DOMAINS.

FIELD OF THE INVENTION

The present invention is related to computer search techniques. It is more particularly related to techniques for searching linked targets.

BACKGROUND OF THE INVENTION

In order to find information in related databases a computerized search is performed. For example, on the World Wide Web, it is often useful to search for web pages of interest to a user. Various techniques are used including providing key words as the search argument. The key words are often related by Boolean expressions. Search arguments may be selectively applied to portions of documents such as title, body etc., or domain URL names for example. The searches my take into account date ranges as well. A typical search engine will present the results of the search with a representation of the page found including a title, a portion of text, an image or the address of the page. The results are typically arranged in a list form at the user's display with some sort of indication of relative relevance of the results. For instance, the most relevant result is at the top of the list following in decreasing relevance by the other results. Other techniques indicating relevance include a relevance number, a widget such as a number of stars or the like. The user is often presented with a link as part of the result such that the user can operate a GUI interface such as a curser selected display item in order to navigate to the page of the result item. Other well known techniques include performing a nested search wherein a first search is performed followed by a search within the records returned from the first search. Today many search engines exist expressly designed to search for web pages via the internet within the World Wide Web. Various techniques are utilized to improve the user experience by providing relevant search results.

Traditionally, graph analysis based rank engines such as GOOGLE's PAGERANK (GOOGLE and PAGERANK are trademarks of GOOGLE Inc.) have presumed only a single type of link, the hyper-link.

GOOGLE is a World Wide Web search engine found at www.GOOGLE.com. GOOGLE search engine ranks pages found in a search using GOOGLE's PAGERANK application. GOOGLE's PAGERANK is described on the World Wide Web at www.webworkshop.net/PAGERANK.html in an article "GOOGLE's PAGERANK Explained and how to make the most of it" by Phil Craven incorporated herein by reference.

GOOGLE's PAGERANK is a numeric value that represents how important a page is on the web. GOOGLE figures that when one page links to another page, it is effectively casting a vote for the other page. The more votes that are cast for a page, the more important the page must be. Also, the importance of the page that is casting the vote determines how important the vote itself is. GOOGLE calculates a page's importance from the votes cast for it. How important each vote is taken into account when a page's PAGERANK is calculated.

According to the referenced Craven article: To calculate the PAGERANK for a page, all of its inbound links are taken into account. These are links from within the site and links from outside the site.

$$PR(A)=(1-d)+d(PR(t1)/C(t1)+\ldots+PR(tn)/C(tn))$$

That's the equation that calculates a page's PAGERANK. It's the original one that was published when PAGERANK was being developed, and it is probable that GOOGLE uses a variation of it but they aren't telling us what it is. It doesn't matter though, as this equation is good enough.

In the equation 't1-tn' are pages linking to page A, 'C' is the number of outbound links that a page has and 'd' is a damping factor, usually set to 0.85.

We can think of it in a simpler way:— a page's PAGERANK=0.15+0.85*(a "share" of the PAGERANK of every page that links to it)

"share"=the linking page's PAGERANK divided by the number of outbound links on the page.

A page "votes" an amount of PAGERANK onto each page that it links to. The amount of PAGERANK that it has to vote with is a little less than its own PAGERANK value (its own value * 0.85). This value is shared equally between all the pages that it links to.

From this, we could conclude that a link from a page with PR4 and 5 outbound links is worth more than a link from a page with PR8 and 100 outbound links. The PAGERANK of a page that links to yours is important but the number of links on that page is also important. The more links there are on a page, the less PAGERANK value your page will receive from it.

If the PAGERANK value differences between PR1, PR2, ... PR10 were equal then that conclusion would hold up, but many people believe that the values between PR1 and PR10 (the maximum) are set on a logarithmic scale, and there is very good reason for believing it. Nobody outside GOOGLE knows for sure one way or the other, but the chances are high that the scale is logarithmic, or similar. If so, it means that it takes a lot more additional PAGERANK for a page to move up to the next PAGERANK level that it did to move up from the previous PAGERANK level. The result is that it reverses the previous conclusion, so that a link from a PR8 page that has lots of outbound links is worth more than a link from a PR4 page that has only a few outbound links.

Whichever scale GOOGLE uses, we can be sure of one thing. A link from another site increases our site's PAGERANK.

Note that when a page votes its PAGERANK value to other pages, its own PAGERANK is not reduced by the value that it is voting. The page doing the voting doesn't give away its PAGERANK and end up with nothing. It isn't a transfer of PAGERANK. It is simply a vote according to the page's PAGERANK value. It's like a shareholders meeting where each shareholder votes according to the number of shares held, but the shares themselves aren't given away. Even so, pages do lose some PAGERANK indirectly, as we'll see later.

For a page's calculation, its existing PAGERANK (if it has any) is abandoned completely and a fresh calculation is done where the page relies solely on the PAGERANK "voted" for it by its current inbound links, which may have changed since the last time the page's PAGERANK was calculated.

The equation shows clearly how a page's PAGERANK is arrived at. But what isn't immediately obvious is that it can't work if the calculation is done just once. Suppose we have 2 pages, A and B, which link to each other, and neither have any other links of any kind. This is what happens:—

Step 1: Calculate page A's PAGERANK from the value of its inbound links

Page A now has a new PAGERANK value. The calculation used the value of the inbound link from page B. But page B has an inbound link (from page A) and its new PAGERANK value hasn't been worked out yet, so page A's new PAGERANK value is based on inaccurate data and can't be accurate.

Step 2: Calculate page B's PAGERANK from the value of its inbound links

Page B now has a new PAGERANK value, but it can't be accurate because the calculation used the new PAGERANK value of the inbound link from page A, which is inaccurate.

It's a Catch 22 situation. We can't work out A's PAGERANK until we know B's PAGERANK, and we can't work out B's PAGERANK until we know A's PAGERANK.

Now that both pages have newly calculated PAGERANK values, can't we just run the calculations again to arrive at accurate values? No. We can run the calculations again using the new values and the results will be more accurate, but we will always be using inaccurate values for the calculations, so the results will always be inaccurate.

The problem is overcome by repeating the calculations many times. Each time produces slightly more accurate values. In fact, total accuracy can never be achieved because the calculations are always based on inaccurate values. 40 to 50 iterations are sufficient to reach a point where any further iterations wouldn't produce enough of a change to the values to matter. This is precisely what GOOGLE does at each update, and it's the reason why the updates take so long.

One thing to bear in mind is that the results we get from the calculations are proportions. The figures must then be set against a scale (known only to GOOGLE) to arrive at each page's actual PAGERANK. Even so, we can use the calculations to channel the PAGERANK within a site around its pages so that certain pages receive a higher proportion of it than others.

The GOOGLE algorithm is further discussed in "The Anatomy of a Large-Scale Hypertextual Web Search Engine" by Brin and Page on the World Wide Web at: "citeseer.ist.psu.edu/cache/papers/cs/13017/http:zSzzSzwww-db.stanford.eduzSzpubzSzpaperszSzGOOGLE.pdf/brin98anatomy.pdf" and incorporated herein by reference.

U.S. Patent application Publication No. 2002/0129014A1 "Systems and methods of retrieving relevant information" filed Jan. 10, 2001 incorporated herein by reference provides systems and methods of retrieving the pages according to the quality of the individual pages. The rank of a page for a keyword is a combination of intrinsic and extrinsic ranks. Intrinsic rank is the measure of the relevancy of a page to a given keyword as claimed by the author of the page while extrinsic rank is a measure of the relevancy of a page on a given keyword as indicated by other pages. The former is obtained from the analysis of the keyword matching in various parts of the page while the latter is obtained from the context-sensitive connectivity analysis of the links connecting the entire Web. The patent also provides the methods to solve the self-consistent equation satisfied by the page weights iteratively in a very efficient way. The ranking mechanism for multi-word query is also described. Finally, the application provides a method to obtain the more relevant page weights by dividing the entire hypertext pages into distinct number of groups.

U.S. Pat. No. 6,701,305 "Methods, apparatus and computer program products for information retrieval and document classification utilizing a multidimensional subspace" filed Oct. 20, 2001 and incorporated herein by reference describes methods, apparatus and computer program products for retrieving information from a text data collection and for classifying a document into none, one or more of a plurality of predefined classes. In each aspect, a representation of at least a portion of the original matrix is projected into a lower dimensional subspace and those portions of the subspace representation that relate to the term(s) of the query are weighted following the projection into the lower dimensional subspace. In order to retrieve the documents that are most relevant with respect to a query, the documents are then scored with documents having better scores being of generally greater relevance. Alternatively, in order to classify a document, the relationship of the document to the classes of documents is scored with the document then being classified in those classes, if any, that have the best scores.

The prior art fails to consider page link attributes when ranking documents.

The Semantic Web provides a common framework that allows data to be shared and reused across application, enterprise, and community boundaries. It is a collaborative effort led by W3C with participation from a large number of researchers and industrial partners. It is based on the Resource Description Framework (RDF), which integrates a variety of applications using XML for syntax and URIs for naming. Information about RDF including "Resource Description Framework (RDF) Model and Syntax Specification found at "www.w3.org/TR/1999/REC-rdf-syntax-19990222"; "Resource Description Framework (RDF) Schema Specification at "www.w3.org/TR/1999/PR-rdf-schema-19990303"; and "RDF/XML Syntax Specification (Revised) at "www.w3.org/TR/rdf-syntax-grammar" all of which are incorporated herein by reference.

"The Semantic Web is an extension of the current web in which information is given well-defined meaning, better enabling computers and people to work in cooperation."— Tim Berners-Lee, James Hendler, Ora Lassila, The Semantic Web, Scientific American, May 2001. More information about the semantic web can be found on the World Wide Web in the W3C Technology and Society Domain document "Semantic Web" at www.w3.or/2001/sw incorporated herein by reference.

An improved search method is needed that more particularly identifies the importance of search targets, thereby providing improved search results.

SUMMARY OF THE INVENTION

The present invention includes features that enable a user to indicate his interest in Semantic Web page types when performing a query such that the resulting Semantic Web pages are displayed according to a weight of the user's interest and other page ranking criteria.

In an embodiment of this invention, Semantic Web page links are utilized in performing search queries of pages in a Semantic Web environment. Web pages semantically linked are associated with semantic page rank indicators, the indicators indicating the degree to which pages are semantically linked to a page. The semantic links represent graphs of semantically linked pages. A page has one or more semantic page rank indicators associated with the page, one indicator for each semantic link.

For an embodiment in accordance with the present invention, a search query including an interest vector is received from a user, the interest vector provides an indication of the interest of the user in pages having semantic page rank indicators. Then, a search is performed on the first plurality of pages, the search identifying pages including a first page and a second page. Custom page rank values are calculated including a first custom page rank value associated with the first page and a second custom page rank value associated with the second page wherein the first custom page rank value is greater than the second custom page value. Finally page representations are presented of pages of the second plurality of pages, wherein the presented page representations identify the first page as more important than the second page based on the associated custom page rank values. In an embodiment, the pages comprise any one of html, xml, JAVA™ script, jpg or gif.

It therefore an object of the invention to provide queries of semantically linked pages, the queries including a user interest vector.

It is another object of the invention to utilize semantic rank indicators wherein the semantic page rank indicators represent a value related to the number of pages that are semantically linked to the corresponding first page or second page.

It is another object of the invention to utilize semantic rank indicators having a value related to the number of links traversed in linking a page to the corresponding first page or second page.

It is another object of the invention to calculate a custom rank value wherein the calculation is a dot-product of the link interest vector and the corresponding page rank divided by the product of the elements of the vectors.

It is another object of the invention to provide semantic query or search wherein the search is limited to domains, pages having semantic links or one or more specified servers.

It is another object of the invention to utilize interest vectors for a semantic search wherein the interest vectors are specified by an interest category of links.

It is yet another object of the invention to utilize semantic interest vectors wherein the interest vector is derived from a GUI user prompt.

Additional features and advantages are realized through the techniques of the present invention. Other embodiments and aspects of the invention are described in detail herein and are considered a part of the claimed invention. For a better understanding of the invention with advantages and features, refer to the description and to the drawings.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

The detailed description explains the preferred embodiments of the invention, together with advantages and features, by way of example with reference to the drawings.

DESCRIPTION OF THE PREFERRED EMBODIMENTS

Figure 1:
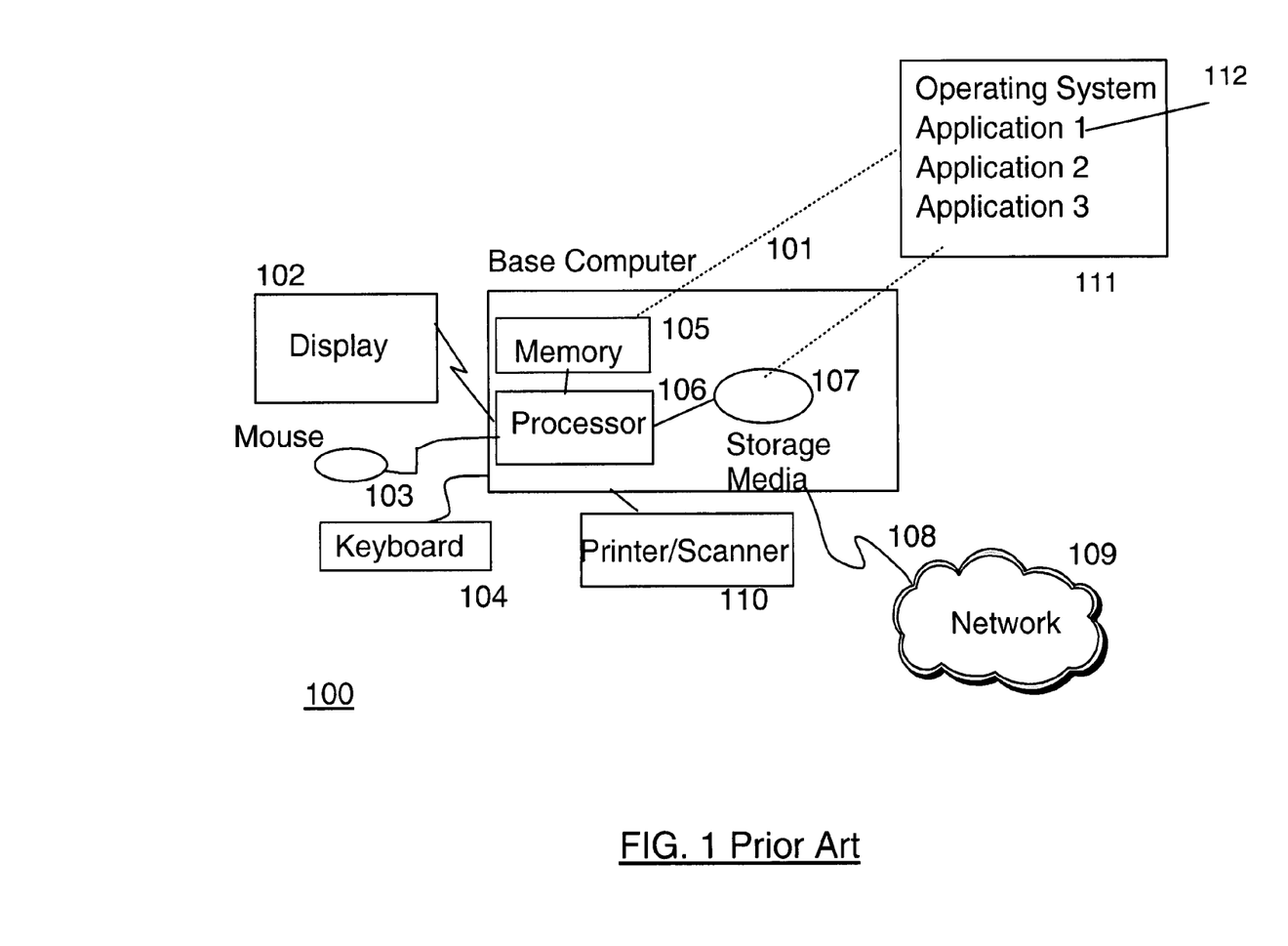
FIG. 1 is a diagram depicting components of a computer system.

FIG. 1 illustrates a representative workstation or server hardware system in which the present invention may be practiced. The system 100 of FIG. 1 comprises a representative computer system 101, such as a personal computer, a workstation or a server, including optional peripheral devices. The workstation 101 includes one or more processors 106 and a bus employed to connect and enable communication between the processor(s) 106 and the other components of the system 101 in accordance with known techniques. The bus connects the processor 106 to memory 105 and long-term storage 107 which can include a hard drive, diskette drive or tape drive for example. The system 101 might also include a user interface adapter, which connects the microprocessor 106 via the bus to one or more interface devices, such as a keyboard 104, mouse 103, a Printer/scanner 110 and/or other interface devices, which can be any user interface device, such as a touch sensitive screen, digitized entry pad, etc. The bus also connects a display device 102, such as an LCD screen or monitor, to the microprocessor 106 via a display,adapter.

The system 101 may communicate with other computers or networks of computers by way of a network adapter capable of communicating with a network 109. Example network adapters are communications channels, token ring, Ethernet or modems. Alternatively, the workstation 101 may communicate using a wireless interface, such as a CDPD (cellular digital packet data) card. The workstation 101 may be associated with such other computers in a Local Area Network (LAN) or a Wide Area Network (WAN), or the workstation 101 can be a client in a client/server arrangement with another computer, etc. All of these configurations, as well as the appropriate communications hardware and software, are known in the art.

Figure 2:
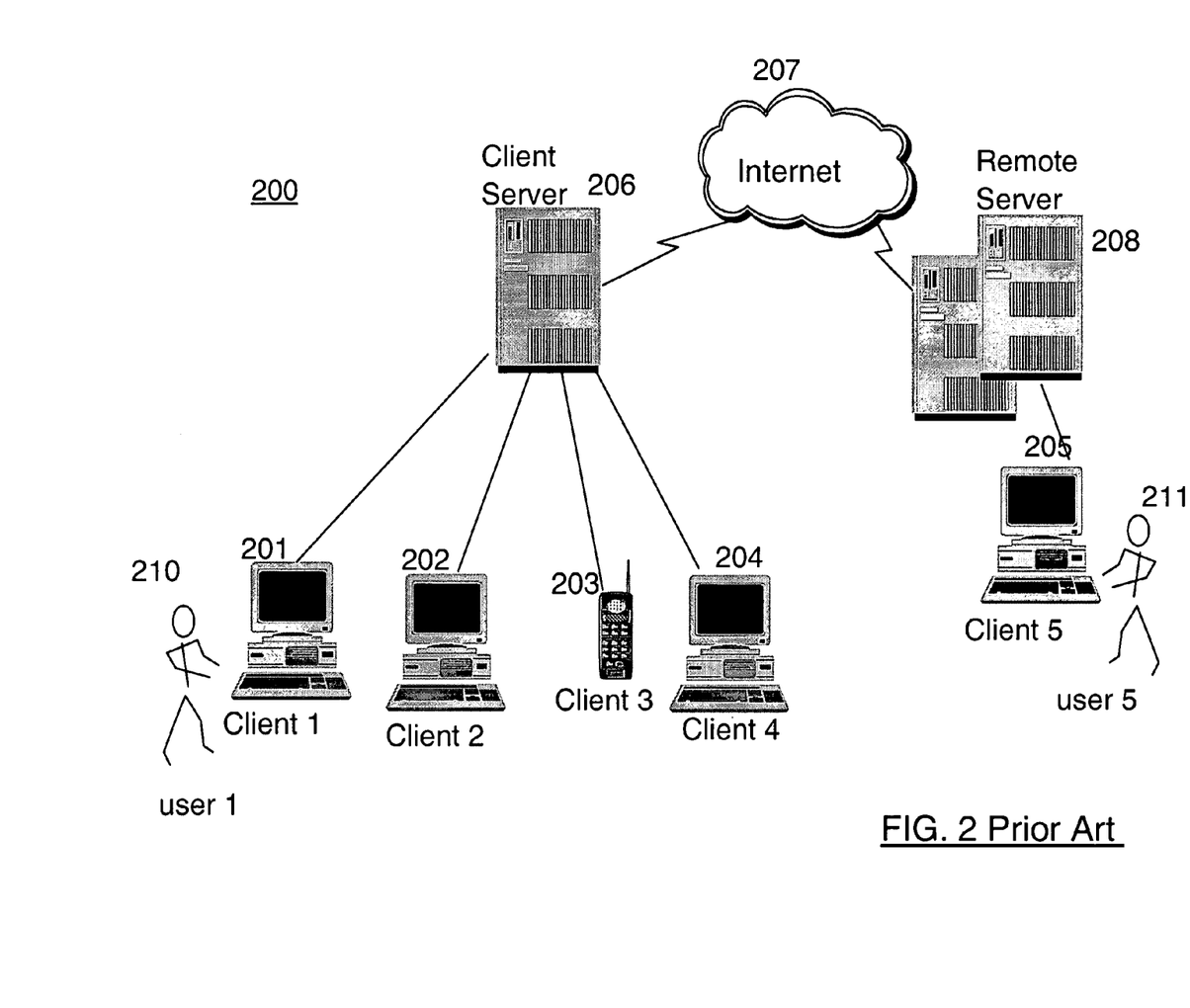
FIG. 2 is a diagram depicting a network of computer systems.

FIG. 2 illustrates a data processing network 200 in which the present invention may be practiced. The data processing network 200 may include a plurality of individual networks, such as a wireless network and a wired network, each of which may include a plurality of individual workstations 101. Additionally, as those skilled in the art will appreciate, one or more LANs may be included, where a LAN may comprise a plurality of intelligent workstations coupled to a host processor.

Still referring to FIG. 2, the networks may also include mainframe computers or servers, such as a gateway computer (client server 206) or application server (remote server 208 which may access a data repository). A gateway computer 206 serves as a point of entry into each network 207. A gateway is needed when connecting one networking protocol to another. The gateway 206 may be preferably coupled to another network (the Internet 207 for example) by means of a communications link. The gateway 206 may also be directly coupled to one or more workstations 101 using a communications link. The gateway computer may be implemented utilizing an IBM eServer zSeries® 900 Server available from IBM Corp.

Software programming code which embodies the present invention is typically accessed by the processor 106 of the system 101 from long-term storage media 107, such as a CD-ROM drive or hard drive. The software programming code may be embodied on any of a variety of known media for use with a data processing system, such as a diskette, hard drive, or CD-ROM. The code may be distributed on such media, or may be distributed to users from the memory or storage of one computer system over a network to other computer systems for use by users of such other systems.

Alternatively, the programming code 111 may be embodied in the memory 105, and accessed by the processor 106 using the processor bus. Such programming code includes an operating system which controls the function and interaction of the various computer components and one or more application programs. Program code is normally paged from dense storage media 107 to high speed memory 105 where it is available for processing by the processor 106. The techniques and methods for embodying software programming code in memory, on physical media, and/or distributing software code via networks are well known and will not be further discussed herein.

In the preferred embodiment, the present invention is implemented as one or more computer software programs 111. The implementation of the software of the present invention may operate on a user's workstation, as one or more modules or applications 111 (also referred to as code subroutines, or "objects" in object-oriented programming) which are invoked upon request. Alternatively, the software may operate on a server in a network, or in any device capable of executing the program code implementing the present invention. The logic implementing this invention may be integrated within the code of an application program, or it may be implemented as one or more separate utility modules which are invoked by that application, without deviating from the inventive concepts disclosed herein. The application 111 may be executing in a Web environment, where a Web server provides services in response to requests from a client connected through the Internet. In another embodiment, the application may be executing in a corporate intranet or extranet, or in any other network environment. Configurations for the environment include a client/server network, Peer-to-Peer networks (wherein clients interact directly by performing both client and server function) as well as a multi-tier environment. These environments and configurations are well known in the art.

Traditionally, graph analysis based rank engines such as GOOGLE's PAGERANK have presumed only a single type of link, the hyper-link, created by specifying an HTML anchor of the form <a href="[URL]">[ANCHOR TEXT]</A> in the document text. The present invention comprises an extension to this model utilizing the Semantic Web where there exist multiple types of links. The invention allows the user to refine a search by not only refining search terms, but also by specifying the types of links he may be interested in, through a "link interest vector."

Figure 4:
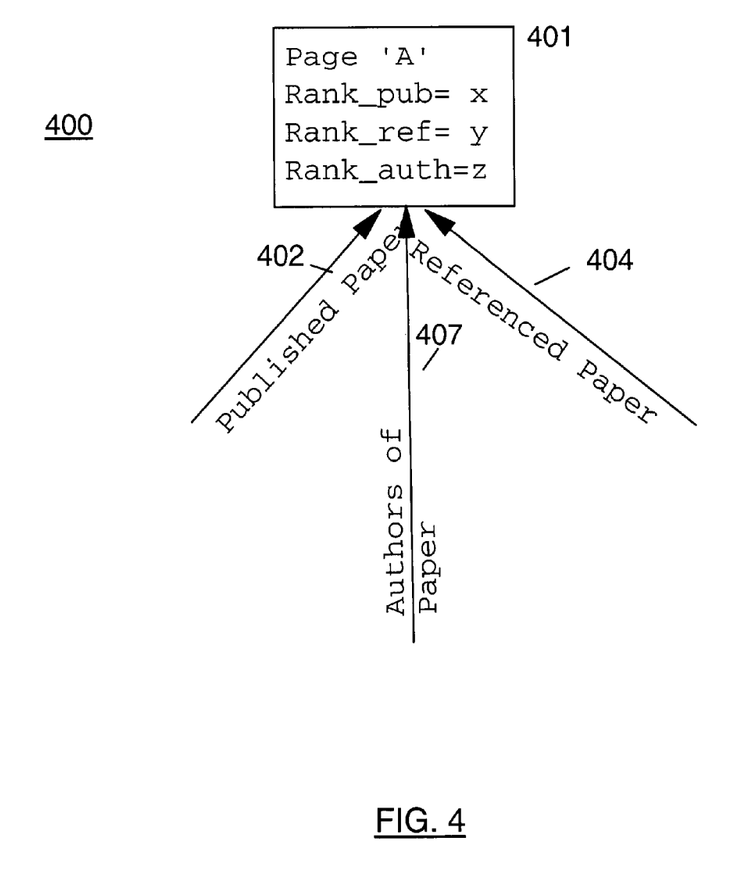
FIG. 4 is an example simple set of semantic links associated with a page.

In a preferred embodiment, the algorithm proceeds as follows:

First, all the sub-graphs of the Semantic Web graph are built, where each sub-graph is the graph induced by one particular link or group of links. For example, the sub-graph induced by the link "citation" is the graph of papers that cite each other. These sub-graphs may contain several disconnected sections as not every page is reachable by every other page by even an arbitrarily large number of links. Next, the individual rank per document per sub-graph is computed, forming a "rank vector" (D) for each document. For example, referring to FIG. 4, suppose there exist three semantic links 402 404 407 that may be used to link pages together. Pages are linked to page "A" 401 via the three links 402 404 407. These three links induce three separate sub-graphs. In this example, D would be a length-3 vector containing the page rank for each of the sub-graphs computed using the traditional PAGERANK algorithm. The final rank per document is computed at query-time, when the user specifies a vector (I), assigning an interest weight for each type of link. Preferably, the document rank is simply the cosine similarity between the link interest vector and the document's rank vector: I.D/|I||D|. (Components of a Cosine Similarity formula V.W/|V||W| are defined where V and W are arbitrary vectors: |V| denotes the length of V, and W.V is the dot-product of W and V.) Cosine similarity is discussed in "An Incremental Similarity Computation Method in Agglomerative Hierarchical Clustering" 2nd International Symposium on Advanced Intelligent Systems found at "brainew.com/research/publish/ISAIS2001/An_Incremental_Similarit y_Computation_Method_in_Agglomerative_Hierarchical_Clustering.pd f" incorporated herein by reference.

Another form of calculating cosine similarity is:

$$\sigma(D, Q) = \frac{\sum_k (t_k \times q_k)}{\sqrt{\sum_k (t_k)^2} \times \sqrt{\sum_k (q_k)^2}}$$

from "Practical 9: Implementing a similarity measure" University of Sunderland at: www.cet.sunderland.ac.uk/~cs0cst/com268/sheets/practical_9.doc Other forms of calculating document rank are possible using techniques known in the art and would be suitable for implementing the present invention.

Referring again to FIG. 3, an example of the relationship of semantic links to pages is depicted. The system includes web pages 305 semantically linked to Page B 303 and to Page C 304. Page B has 5 pages semantically linked via a "Rank_pub" semantic link 306 307. Page C has 10 pages semantically linked via a "Rank_ref" semantic link 306 309. Page B 303 is semantically linked to page A 301 via a single "Rank_pub" semantic link 302 and page C 304 is linked to page A 301 via a single "Rank_ref" semantic link 310. Page A therefore has Semantic Ranking of 5 for Rank_pub link and 10 for Rank_ref link derived form linked pages.

In a preferred embodiment, many semantic links will exist and it will be burdensome to compute a separate page rank for each link. Instead of specifying an interest vector whose entries are weights for individual links, the user specifies weights for groups of links. Examples of such groups of links are the set of links used by one particular organization and all links relating to the subject of publication. It is preferable to logically partition the links into interest categories. Two pages will be linked by a particular interest category if they are linked by at least one link in that category. Interest categories should be chosen so that computing one page rank per category is feasible. One such interest category might contain all semantic links relating to biology. Furthermore, one individual semantic link may belong to one or more interest categories. An interest category would preferably be implemented as a list, the list title comprising the category "biology" and the items on the list comprising the links included in the interest category.

In the context of the Semantic Web, a "page" is any document or data item which contains links to other documents or data. Specifically, pages are not restricted to HTML documents (HTML documents are often used to present a page in the World Wide Web). The links between Semantic Web pages are usually, but not always, defined in "RDF". Furthermore, these links are semantic relationships in that they have a specific meaning or type. For example, "Author of" is a semantic link of such a relationship that may be used to link the page of an author to the page containing some publication that was authored by the author. The Semantic Web also supports additional metadata about pages. However, this metadata is beyond the scope of the present invention.

The present invention provides a method for utilizing the links between pages in the Semantic Web to provide better search capabilities. GOOGLE's PAGERANK algorithm uses links between pages as the basis for searching but it only considers one type of link. The Semantic Web allows arbitrary links between pages by labeling the link according to a Semantic "dictionary".

To illustrate the improvement of the present invention over existing page-rank based searches, traditional page rank gives high relevance to search results that have high total "in-degree" on the World-Wide-Web, i.e. pages to which many other pages contain hyperlinks. The present invention yields search results that have many "in-bound" links wherein the links have a certain semantic meaning.

For example, a paper is published on the web by a usually popular author. Many publication indices may contain links (hyperlinks) to this paper. However, this paper turned out to contain inaccurate results, and hence, few other papers cite this paper. A search engine based on traditional PAGERANK, such as the GOOGLE search engine, might place this paper at the top of the search results for a search containing key-words in the paper because the paper web page is referenced by many web pages. This is a problem because even though the paper has high total in-degree, few other papers reference it, so this paper may rank low in the opinion of some knowledgeable users. The present invention solves this problem.

Figure 3:
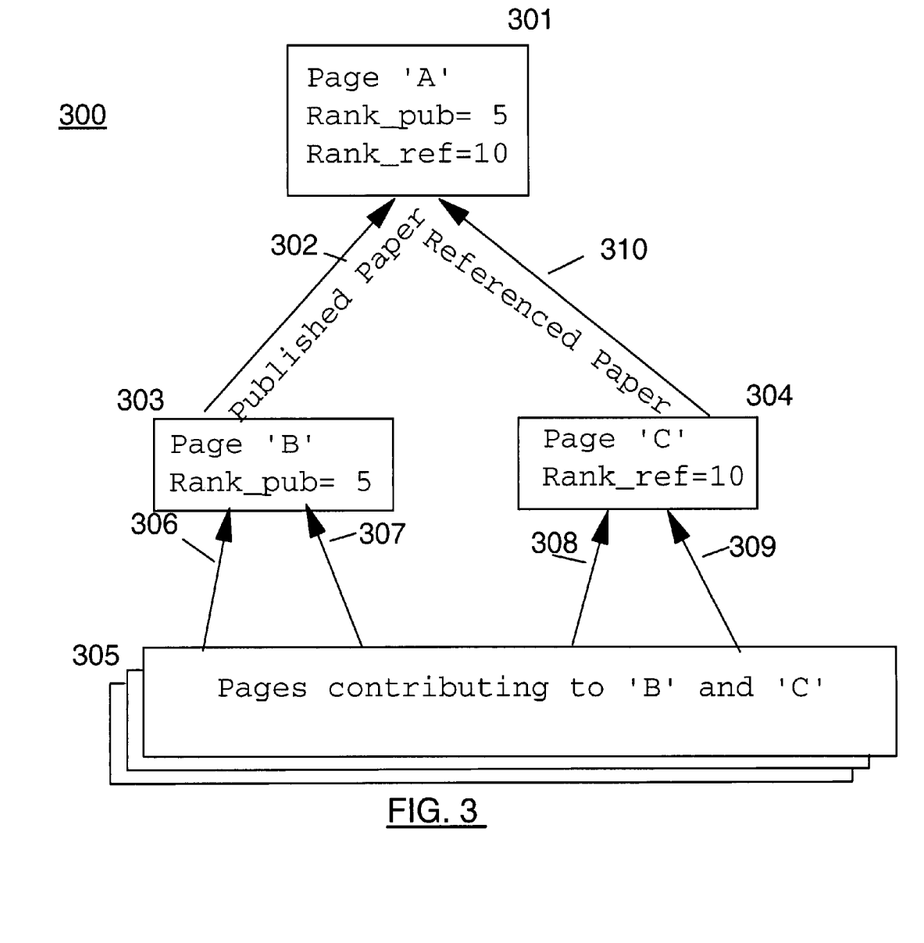
FIG. 3 is an example simple set of semantically linked pages.

In an embodiment (referring to FIG. 3), a simple Semantic Web containing only two possible semantic links "published-paper" 302 and "references-paper" 310 is shown. In this Semantic Web, links contained in publication indices will be of type "published-paper" 302 and links in online-papers will be of type "references-paper" 310. In addition to submitting a key-word list, the user also provides an interest vector, e.g. [0.4, 0.8] indicating a low interest [0.4] in published paper references and a high interest [0.8] in papers referenced by other papers. This interest vector will be used to adjust the search results. FIG. 3 shows a simple set of page ranks for "Published Paper" (Rank_pub=5) and "Referenced Paper" (Rank_ref=10) relationships in order to teach elements of the invention by example. Cosine similarity is defined as:

$$COS(theta\_X\_Y)=(X.Y)/(|X||Y|)$$

where X.Y is the "dot-product" of X and Y. That is, $X.Y=x1*y1+x2*y2 \ldots xn*yn$. $|X||Y|$ is the product of the number of elements X times the number of elements of Y. From other pages, Page B 303 has a page rank for "Published Paper" of Rank_pub=5 and Page C 304 has a page rank for "Referenced Paper" of Rank_ref=10. Therefore, D=[5,10]. A search user might specify an interest vector "I" of ["Published Paper" of 0.4, "Referenced Paper" of 0.8]. Therefore I=[0.4, 0.8]. The users custom page rank is 2.5 calculated as follows:

$$[I.D/|I||D|]=I1*D1+I2*D2/(|I||D|)=(0.4*5)+(0.8*10)/(2)*(2)=[2+8]/4=2.5$$

where |I| comprises 2 interest vectors I=[0.4, 0.8] and |D| comprises 2 page rank vectors D=[5, 10].

This page rank is then used in conjunction with other search techniques including text matching algorithms to compute the display relevancy of the actual search results.

RDF is the current language of the emerging Semantic Web. A preferred implementation of this invention is based upon RDF. For example, the various links between pages are represented as RDF statements, such as "Page B 'Published Paper' Page C" which provides the Semantics for the link from Page B to Page C as a "published paper" link. An interest vector, is implemented as a vector of (URIs, weight) pairs, one for each RDF predicate or groups of predicates. "Published Paper" is the human readable name of the predicate whose semantic meaning is "the subject published a paper". The actual RDF predicate for a "Published Paper" URI might look like:

"http://www.myorg.org/#RDF/predicates/publishedpaper".

The human-readable name as well as further semantic information is found by resolving this URI.

The interest vector of a user is preferably specified at search time in the advanced section of the search form. In an optional embodiment, the interest vector is part of the user's profile. The form for specifying the interest vector preferably presents a convenient way to select amongst available predicates. In a preferable implementation of the Semantic Web, there are thousands of predicates to choose from to populate the interest vector. Preferably, all predicates not specified by the user in the interest vector are given a neutral value. Therefore the interest vector is used to express above average interest or disinterest in certain relationships. Thus, a search can be performed on heterogeneous group of web pages, wherein some of the pages have no Semantic links.

Figure 5:
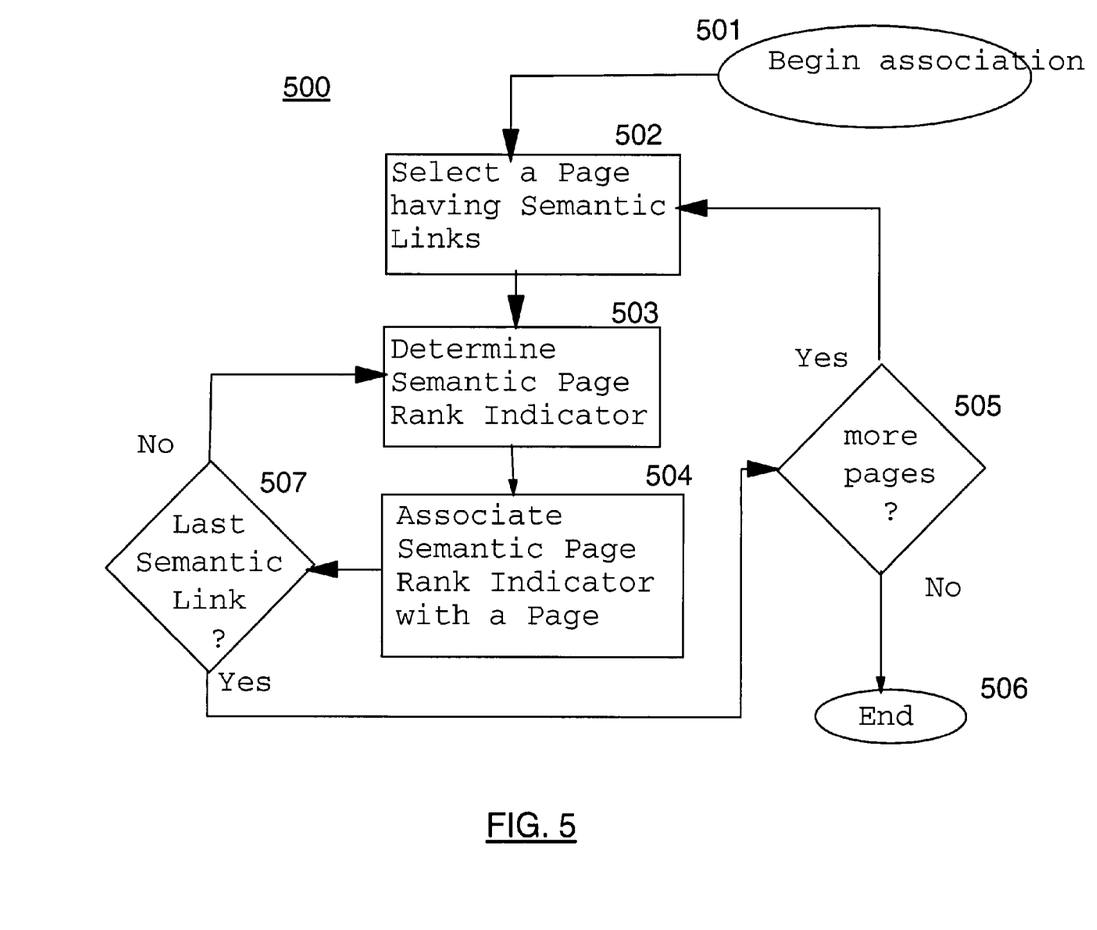
FIG. 5 is a depiction of the steps of associating semantic page rank indicators with a page.

Referring now to FIG. 5, an example of the invention using Semantic page links in performing search queries of pages in a semantic web environment is illustrated. In an embodiment, web pages semantically linked are associated with semantic page rank indicators, the indicators indicating the degree to which pages are semantically linked to a page. A page is selected 502 and the semantic links are traced to determine 503 semantic page rank indicators to be associated 504 with the page. Each semantic link is traced 507 for each page 505. The semantic links representing graphs of semantically linked pages. A page having one or more semantic page rank indicators associated with the page, one indicator for each semantic link.

Figure 6:
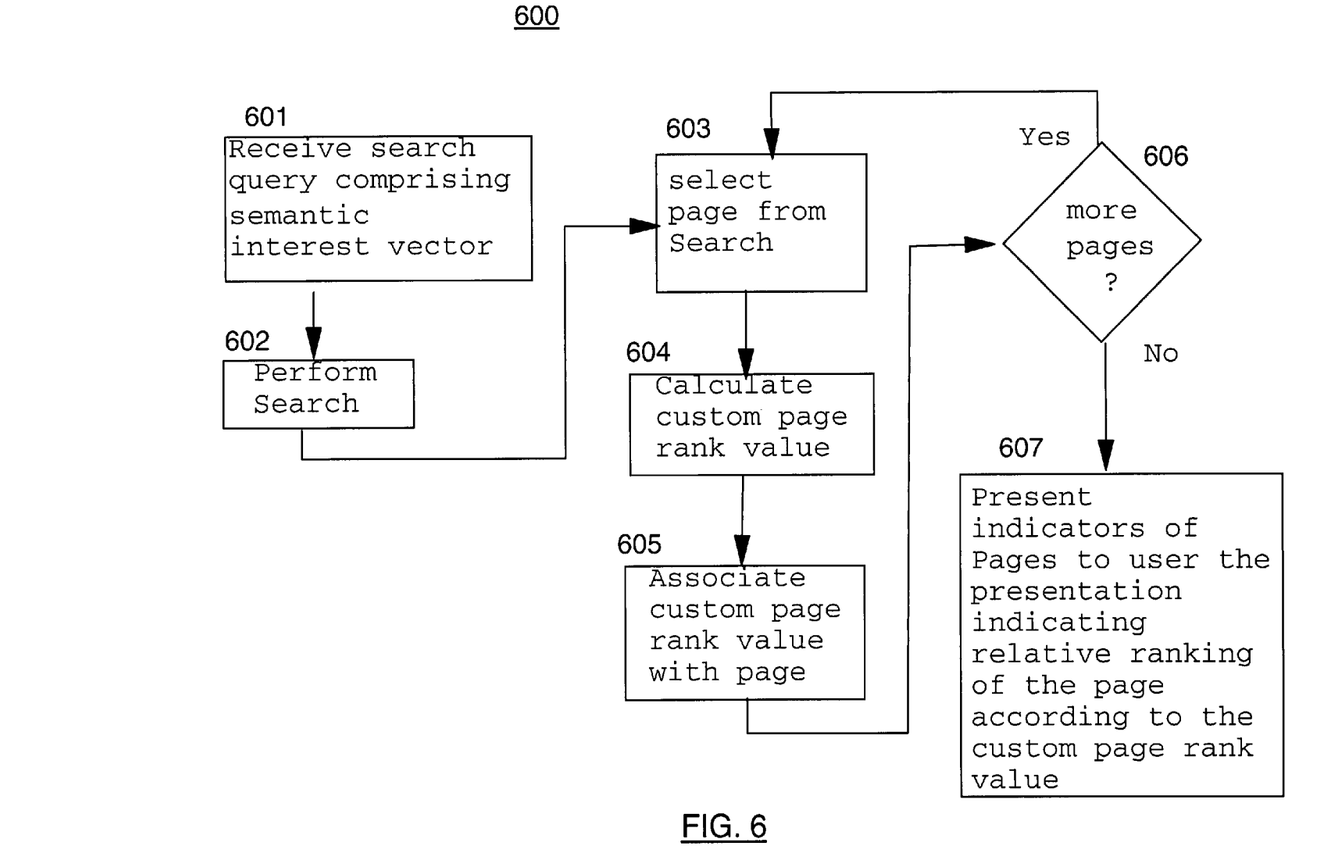
FIG. 6 is a depiction of the steps of performing a query using semantic links.

Referring now to FIG. 6, an example of a search query is illustrated. In step 601, a search query is received from a user, the search query comprising an interest vector, the interest vector providing an indication of the interest of the user in pages having semantic page rank indicators. Then, a search is performed 602 based on user supplied information such as keywords on the first plurality of pages, the search identifying a second plurality of pages 603, the second plurality of pages 603 comprising the first page and the second page. A calculation is performed 604 to calculate a first custom page rank value associated 605 with the first page and a second custom page rank value associated 605 with the second page 606 wherein the first custom page rank value is greater than the second custom page value and finally 606 presenting 607 page representations of pages of the second plurality of pages, wherein the presented page representations identify the first page as more important than the second page based on the associated custom page rank values.

In an embodiment, queries of semantically linked pages, the pages comprise any one of html, xml, JAVA script, jpg or gif.

In an embodiment semantic rank indicators are provided wherein the semantic page rank indicators represent a value related to the number of pages that are semantically linked to the corresponding first page or second page.

In an embodiment, semantic rank indicators are provided having a value related to the number of links traversed in linking a page to the corresponding first page or second page.

In an embodiment, a custom rank value is calculated wherein the calculation is a dot-product of the link interest vector and the corresponding page rank divided by the product of the elements of the vectors.

In an embodiment, semantic query or search is provided wherein the search is limited to any one of one or more domains, pages having semantic links or one or more specified servers.

In an embodiment, interest vectors for a semantic search are specified by an interest category of links.

In an embodiment, the semantic interest vector is derived from a GUI user prompt.

The capabilities of the present invention can be implemented in software, firmware, hardware or some combination thereof.

As one example, one or more aspects of the present invention can be included in an article of manufacture (e.g., one or more computer program products) for instance, computer usable media. The media has embodied therein, for instance, computer readable program code means for providing and facilitating the capabilities of the present invention. The article of manufacture can be included as a part of a computer system or be sold or licensed separately.

Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

While the preferred embodiment of the invention has been illustrated and described herein, it is to be understood that the invention is not limited to the precise construction herein disclosed, and the right is "reserved" to all changes and modifications coming within the scope of the invention as defined in the appended claims.

What is claimed is:

1. A computer-implemented method for querying semantically linked web pages in a semantic web comprising web pages linked by semantic links, each semantic link characterized as having a label providing a specific semantic link type, the method comprising:

receiving a query from a user, the query comprising one or more interest vectors, an interest vector representing an amount of user interest in web pages related to a corresponding semantic link type;

based on the received query, searching a plurality of pages, the search identifying semantically linked web pages comprising at least a first page and a second page, the first page semantically linked to a target web page by a first semantic link type, the second page semantically linked to the target web page by a second semantic link type;

obtaining a first page rank value related to the first page and a second page rank value related to the second page, the first page rank value indicating a value associated with the first semantic link type and the second page rank value indicating a value associated with the second semantic link type;

calculating a first custom page rank value associated with the first page, the calculation based on the obtained first page rank value and the one or more interest vectors;

calculating a second custom page rank value associated with the second page, the calculation based on the obtained second page rank value and the one or more interest vectors; and storing in a computer memory, as page rank values related to the target page, the calculated first custom page rank value and the calculated second custom page rank value.

2. The method according to claim 1 wherein the plurality of pages consist of any one of html, xml, JAVA™ script, jpg or gif.

3. The method according to claim 1 wherein the first page rank value comprises a first page rank indicator indicating a degree to which pages are semantically linked to the first page of the corresponding semantic link type, wherein second page rank value comprises a second page rank indicator indicating a degree to which pages are semantically linked to the second page of the corresponding semantic link type, wherein the obtaining step further comprises:

determining for each page of the first page and the second page, one or more semantic page rank indicators, a semantic page rank indicator comprising a value related to the number of pages that are semantically linked by a semantic link type to the associated page; and storing the one or more semantic page rank indicators associated with the first page and the one or more semantic page rank indicators associated with the second page.

4. The method according to claim 3 wherein the value related to the number of pages that are semantically linked is related to a number of links of the corresponding semantic link type traversed in linking a page to the target page.

5. The method according to claim 1 wherein the calculation comprises the step of:

calculating a custom page rank value I.D/|I||D| by performing the steps of:

finding a dot-product of the interest vector (I) and a corresponding page rank value vector (D); and dividing the dot-product by a product of the elements (I and D) of the vectors to determine.

6. The method according to claim 1 wherein the query is limited to any one of one or more domains, pages having semantic links or one or more specified servers.

7. The method according to claim 1 wherein the one or more interest vectors are specified by an interest category of a plurality of semantic link types.

8. The method according to claim 1 wherein the interest vector is derived from a GUI user prompt.

9. The method according to claim 1 comprising the further steps of:

determining that the first custom page rank value is greater than the second custom page rank value; and presenting page representations of the first page and the second page wherein the page representations indicate that the first page is more important than the second page based on the determining step.

10. The method according to claim 9 wherein the page importance is indicated by any one of sequence, color, associated widget, highlighting, size or position.

* * * * *